United States Patent [19]

Piatt

[11] Patent Number: 5,005,674
[45] Date of Patent: Apr. 9, 1991

[54] BI-DIRECTIONAL ROTATING GRIP BRAKE FOR USE WITH A CONVENTIONAL HAND BRAKE SYSTEM OF A BICYCLE

[76] Inventor: John A. Piatt, 226 Getchell St., Santa Cruz, Calif. 95060

[21] Appl. No.: 475,149

[22] Filed: Feb. 5, 1990

[51] Int. Cl.⁵ .......................... B62L 1/00; B62L 3/00
[52] U.S. Cl. .................................. 188/24.11; 74/489; 74/551.8; 74/502.2; 74/501.6; 188/2 D; 188/24.22
[58] Field of Search .................. 188/24.11–24.22, 188/2 D, 105, 106 P, 106 R; 74/489, 501.6, 502.2, 471 R, 551.8

[56] References Cited

U.S. PATENT DOCUMENTS

| | | | |
|---|---|---|---|
| 3,760,648 | 9/1973 | Hoffman | 188/24.11 X |
| 3,835,724 | 9/1974 | Hoffman | 188/24.22 X |
| 3,905,242 | 9/1975 | Hoffman | 74/489 X |
| 3,977,270 | 8/1976 | Cristie | 74/489 X |
| 4,653,613 | 3/1987 | Blancas | 188/24.11 |
| 4,901,595 | 2/1990 | Ozaki et al. | 188/2 D |

*Primary Examiner*—Douglas C. Butler
*Attorney, Agent, or Firm*—Robert Charles Hill

[57] ABSTRACT

In accordance with the invention, conventional cable operated, pull up braking systems can be combined with a pair of bi-directional, rotatable grip subassemblies to provide braking action without change in the rider's grip. Each subassembly of the invention includes a cord attached to a hand grip that includes a longitudinal bore that is slidable about but rotatable with respect to the handle bar. In one embodiment, each hand grip includes a cylinder having an enlarged head, a central segment and a longitudinal bore slightly greater in diameter than the handle bar. At the exterior of the central segment is an exterior cylindrical cover preferably of compressible rubber. The outer diameter of the compressible cover is larger than that of the enlarged head of the support cylinder, and is of sufficient length to comfortably accommodate the grip of the rider. At the interior of the central segment is a pair of bearings prepared by wrapping two separate lengths of ultra high molecular weight tape about the handle bars. In that way, with the rider gripping the hand grips but not the movable members of the conventional braking system, rotation of at least one of the hand grips relative to the handle bars in either a counter-or clockwise direction is translated into linear movement of the cable attached to the movable member whereby braking action is achieved at the front and/or back wheel brake subassemblies of the bicycle. In carrying out the invention, the method steps are also described.

15 Claims, 4 Drawing Sheets

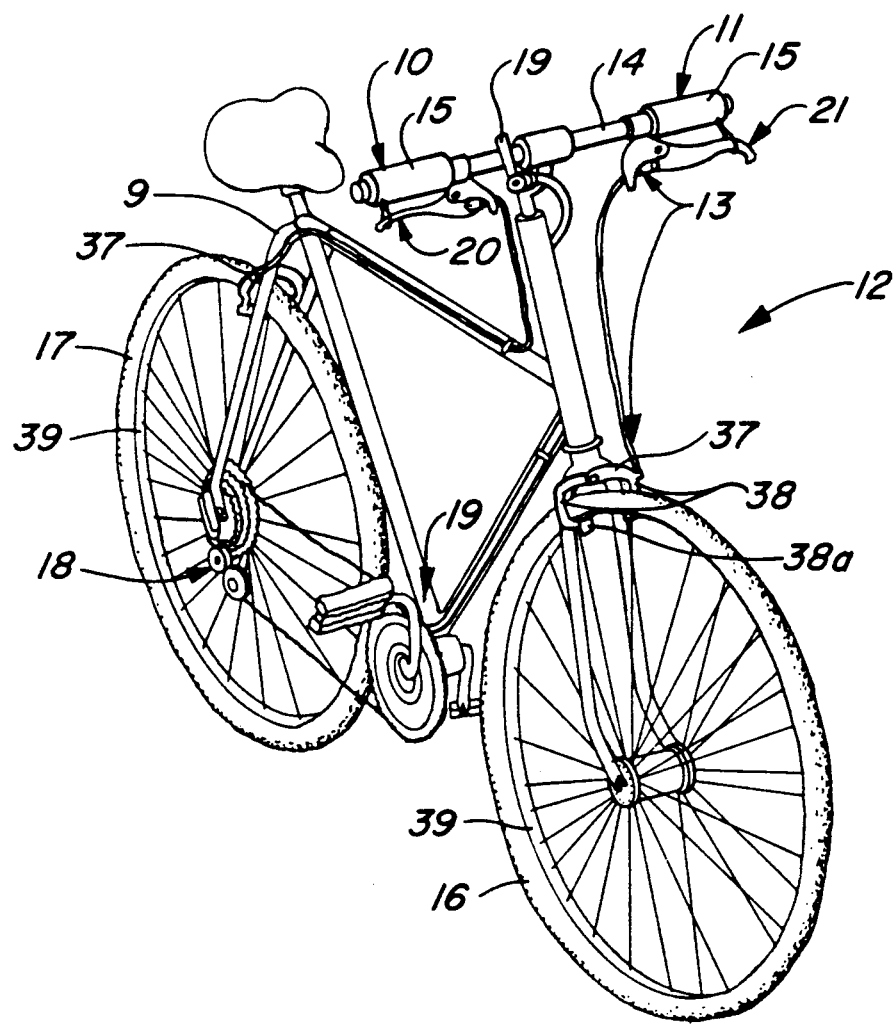
FIG._1

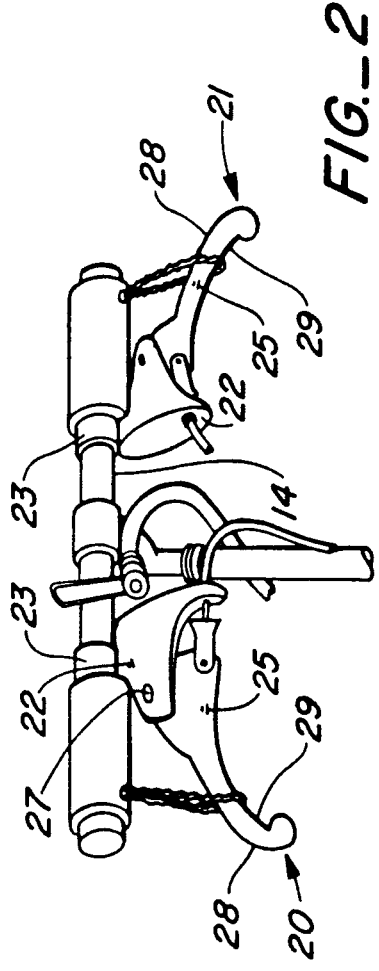
FIG._2
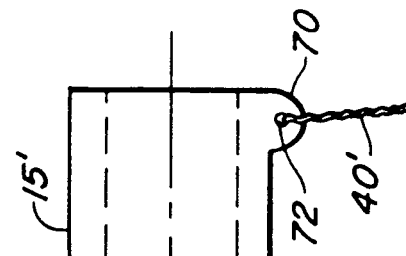
FIG._12
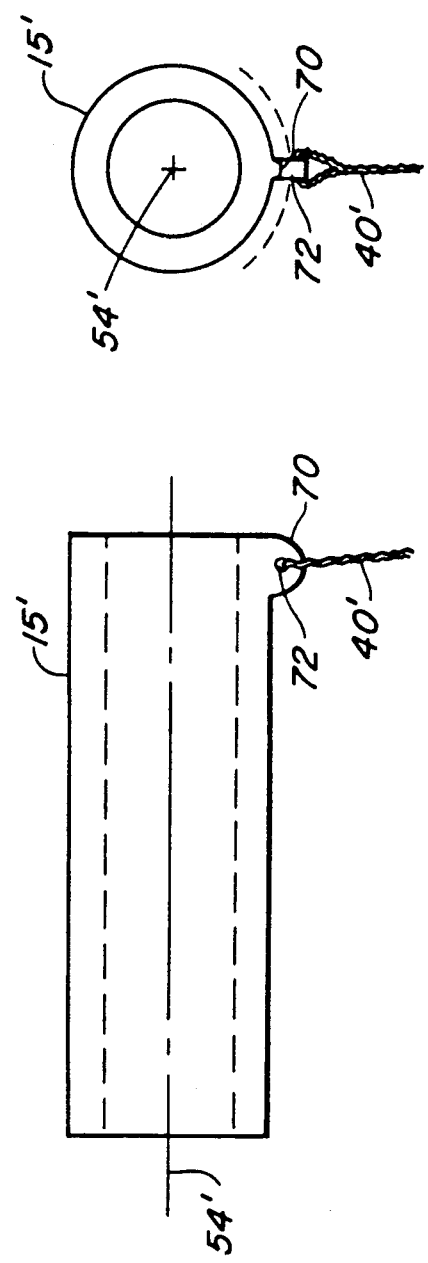
FIG._11

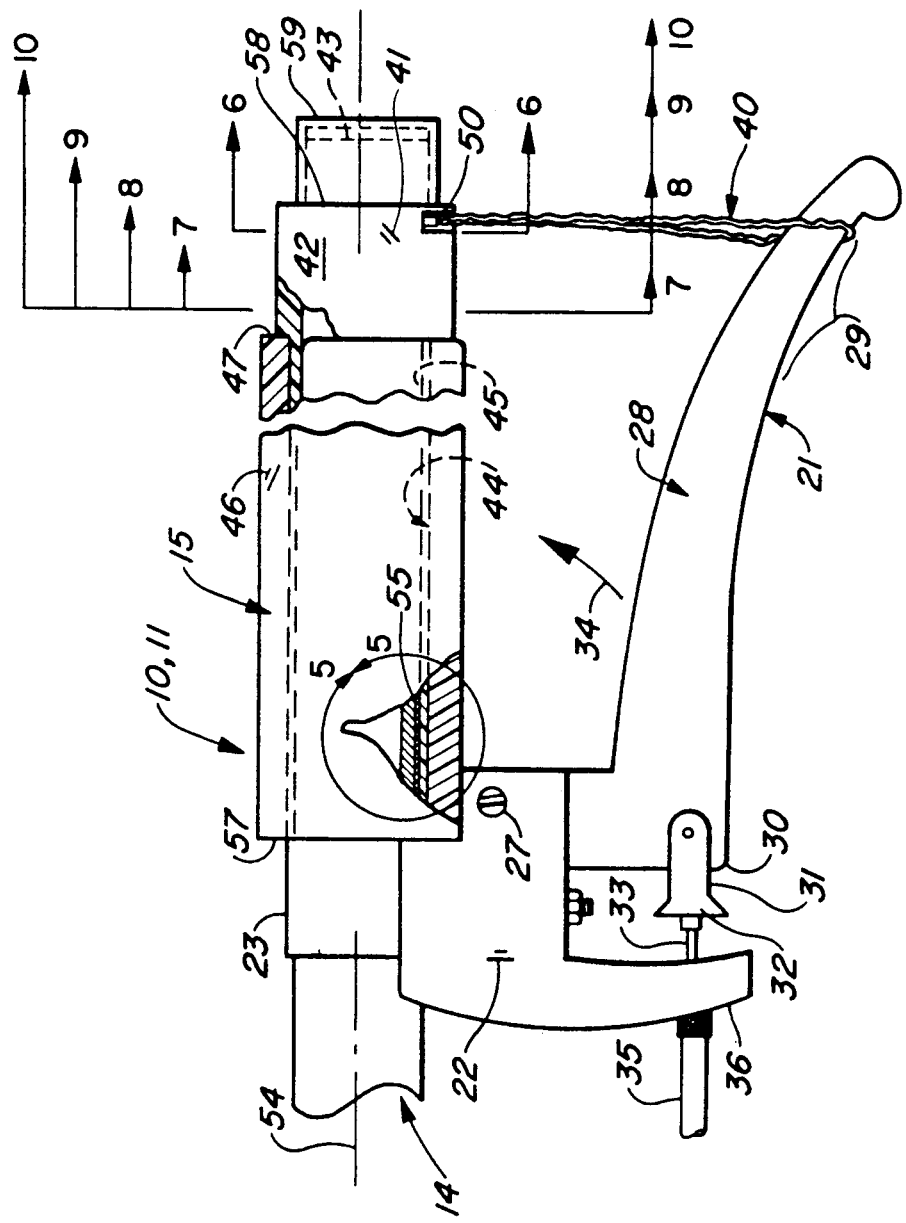
FIG._3
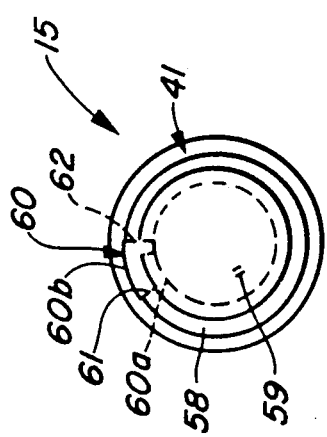
FIG._4
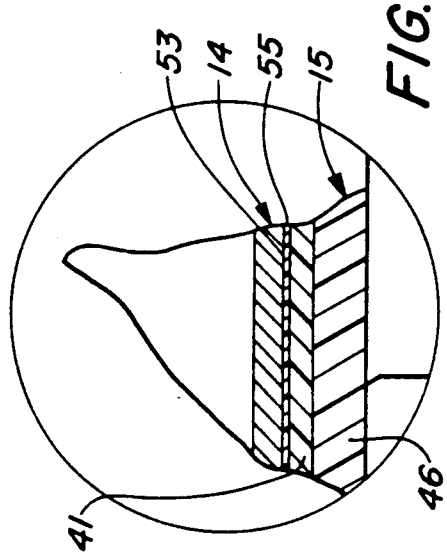
FIG._5

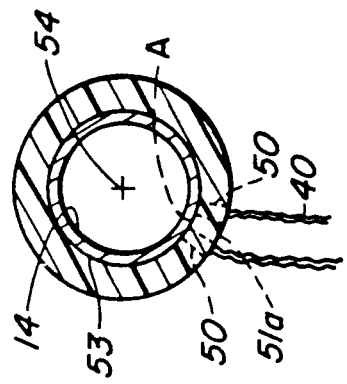
FIG._7
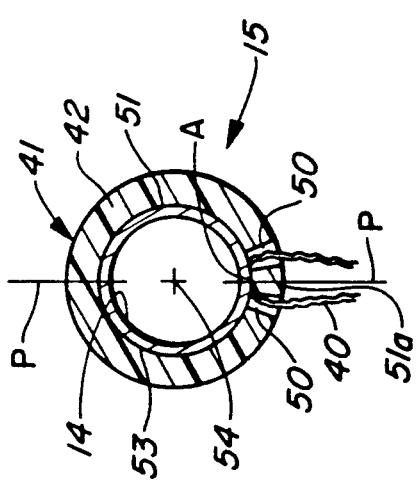
FIG._6
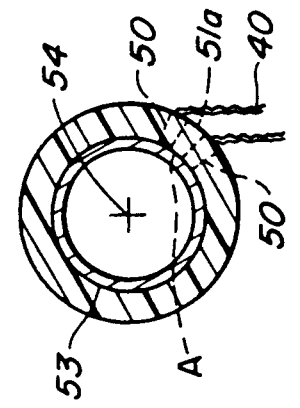
FIG._10
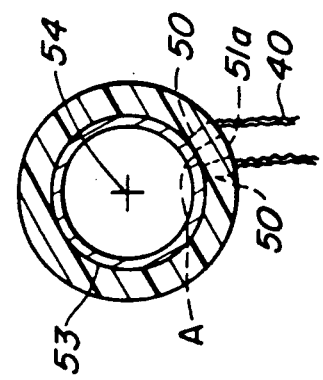
FIG._9
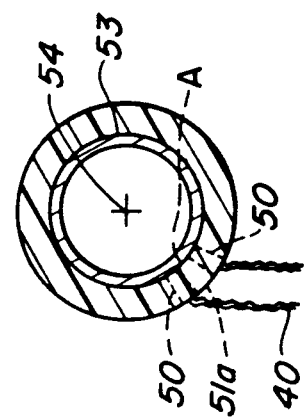
FIG._8

BI-DIRECTIONAL ROTATING GRIP BRAKE FOR USE WITH A CONVENTIONAL HAND BRAKE SYSTEM OF A BICYCLE

FIELD OF THE INVENTION

This invention relates to hand operable braking systems for bicycles using multi-sprockets controlled by cable-operated derailleurs.

A multiple sprocketed bicycle includes at least two rear wheel sprockets of different sizes. The chain is moved between the sprockets by a cable-operated derailleur to change gear ratios and hence forward speed of the bicycle as a function of sprocket rotation. But the chain must have sufficient slack to accommodate movement between the varying diametered sprockets. Since operation of prior art coaster brakes depend on minimum slackness in the chain, such multi-sprocket, derailleur systems have dictated the concomitant use of rim gripping braking systems.

While the elements of such braking systems vary, for the most part, they include a pair of levered subassemblies mounted to the handle bars of the bicycle. Each subassembly includes a stationary member and movable member. A flexible cable is attached to the movable member and extends through a flexible sheath to a front or rear wheel brake subassembly. In operation, the hands of the rider grip the levered subassemblies to cause pivoting of the movable members about pivot axes normal to the handle grips attached to the handle bars. However, note that there is a need to shift the grip of the rider's hands to operate the movable members, which can be a drawback. That is, the required hand movement can result in a loss of control of the bicycle. While solution to that problem has been addressed in the prior art, (see for example, U.S. Pat. No. 4,653,613 for "ROTATING GRIP BRAKE FOR BICYCLES" R. Blances, and U.S. Pat. No. 2,271,273 for "HYDRAULIC BRAKE CONTROL FOR BICYCLES", H. L. Mueller), these results are expensive and difficult to implement because of they require scrapping usual attendant conventional braking systems as well as being somewhat unsatisfactory in operation especially for the novice rider. This is because the rider must initiate braking action by rotation of his hand grip in one direction only so that the correct position of the rider when applying the twisting force is of importance. Accordingly, there is a need for means that can be economically used in association with conventional braking systems of bicycles (whether associated with conventional, mountain or racing bikes) yet allow bi-directional rotating braking action to be applied through the handle gripes to the movable member of the conventional braking system without change in the rider's grip.

SUMMARY OF THE INVENTION

In accordance with the invention, the advantages of conventional cable operated, pull up braking systems can be novelly combined with a pair of bi-directional, rotatable grip subassemblies to provide braking action without change in the rider's grip. Each grip subassembly of the invention includes a loopable cord attached to a hand grip that includes a longitudinal bore that is slidable about but rotatable with respect to the handle bar.

In one embodiment, each of the hand grips includes a support cylinder having an enlarged head, a central segment and a longitudinal bore slightly greater in diameter than the handle bar ends. The longitudinal bore extends through both the central segment and the enlarged head in concentric fashion. At the exterior of the central segment is an exterior compressible cylindrical cover preferably of compressible rubber. The cover has its longitudinal bore in gripping contact with the central segment of the support cylinder and terminates in contact with the enlarged head. Also the outer diameter of the compressible cover is larger than that of the enlarged head of the support cylinder, and is of sufficient length to comfortably accommodate the grip of the rider. Furthermore, the enlarged head is fitted with a pair of radial openings. The pair of openings connect the longitudinal bore with the exterior surface, and house the loopable cord. When the grip is attached in telescoping fashion to the end portion of the handle bar (previously prepared by wrapping two separate lengths of ultra high molecular weight tape at two locations spaced apart a distance that is less than the length of the hand grip), the pair of openings and loopable cord are positioned closely (in a radial direction) adjacent to the movable member of a conventional braking system. A forward end of the grip is butted against the stationary member of the same braking system. A rearward end is placed in butting contact with an end cap. The end cap includes a cavity attached to the handle bars by means of an adhesive such as glue or the like. The cord attaches in a loop between the grip and an angled concave handle of the movable member. Attachment of the cord to the grip is via that portion of the side wall of the enlarged head located between the pair of radial openings. Hence precise manual rotary movement of the grip by the rider in either a counter or clockwise direction can be used to cause pivoting of the movable member toward the hand grip. Furthermore, such movement is transferred to the braking subassembly at the wheel(s) via linear movement of the cable attached to the movable member. Such linear cable movement is direct function of the arcuate distance the attachment surface (at the cord and rod) moves from its central, non-braking nadir position about a point of formation coincident with the axis of symmetry of the hand grip. In carrying out the invention, the following steps are performed in sequence:

(i) establishing a radial attaching means in the enlarged head of the grip, the attaching means being positioned in the side wall of a support cylinder away a selected radial distance from an axis of symmetry of the grip;

(ii) attaching a loopable cord to the grip by passing the cord end into and then reversing direction about a support means of the attaching means and pulling the cord through until cord lengths relative to the attaching and support means are substantially equal;

(iii) forming a pair of plastic bearings near an end of the handle bars by wrapping two separate lengths of ultra high molecular weight plastic tape around the handlebars at spaced apart locations along the handle bars wherein the distance between bearing is at least less than the length of the hand grip;

(iv) telescopically attaching the hand grip to the handle bars defined by the plastic bearings of step (iii) wherein the radial attaching means and loopable cord are closely adjacent to the movable member of the conventional pull-up braking system, and wherein the forward end of the hand grip butt against the stationary member of the braking system at one end;

(v) attaching an end cap to the handle bars whereby the side wall of end cap butts against the rearward end of the hand grip;

(vi) tieing the ends of the cord about an angled concave handle of the movable member and then adjusting the pull-up distance of the movable member so that minimum space exists between the friction shoes and the wheel rim at the front or rear wheel brake subassembly;

(vii) with the rider gripping the grip but not the movable member of the conventional braking system, rotating the grip relative to the handlebar end in either a counter- or clock-wise direction wherein the attaching surface between the cord and the attaching means is caused to travel an arcuate distance centered at a point of formation coincident with the axis of symmetry of the hand grip;

(viii) transforming the arcuate travel of the attaching means of step (vii) into linear movement of the cable attached to the movable member whereby controlled braking action is achieved at the front or rear wheel brake subassembly.

DESCRIPTION OF THE DRAWINGS

FIG. 1 is a perspective representation of a pair of bi-directionally rotatable grip subassemblies of the present invention for use in association with a conventional cable operated, pull-up braking system attached to handle bars of a multi-sprocketed bicycle controlled by a cable-operated derailleur;

FIG. 2 is a fragmentary enlargement of the grip subassemblies of FIG. 1, illustrating that the grip subassembly of the present invention is closely adjacent to the stationary and moveable members of the braking system of FIG. 1;

FIG. 3 is a side view of the one of the pair of subassemblies of FIG. 2 enlarged and partially cut-away to illustrate the grip subassembly of the present invention in more detail;

FIG. 4 is an end view of an alternate embodiment of the present invention, illustrating a latching mechanism useful in locking the grip subassembly of the invention, in a stowed, non-operating condition;

FIG. 5 is an enlarged detail of the grip subassembly of FIG. 3 taken along line 5—5 thereof;

FIG. 6 is a section taken along line 6—6 of FIG. 3 with the grip subassembly being in a non-braking nadir position;

FIGS. 7 and 8 are sections taken along lines 7—7 and 8—8 of FIG. 3 with the grip subassembly being in progressive increasing braking positions in a clock-wise direction;

FIGS. 9 and 10 are sections taken along lines 9—9 and 10—10 of FIG. 3 with the grip subassembly being in progressive increasing braking positions in a counter clock-wise direction;

FIGS. 11 and 12 are side and rear view, respectively, of an alternative hand grip useful in the present invention.

DETAILED DESCRIPTION OF THE INVENTION

FIG. 1 illustrates a pair of grip subassemblies 10, 11 of the present invention installed on multi-sprocketed, derailleur controlled bicycle 12 for use in association with conventional cable operated, pull-up braking system 13. Bicycle 12 includes a frame 9 and is designed for steep or obstacle roads and is of a type commonly called a "mountain bike" or a "BMX". The substantially straight handle bars 14 enable the rider to firmly grip hand grips 15 of grip subassembly 10 or 11. Yet as explained in more detail below, such hand grips 15 provide for controlled braking action at either front or rear wheels 16, 17 using the braking action as provided by the convention braking system 13 without change in the rider's grip. Suffice to say as this time, that braking action is provided when hand grips 15 are rotated in either a counter- or clockwise direction relative to the handle bars 14.

A multi-sprocket gear assembly 18 at the rear wheel 17 along with a slack-compensating derailleur chain shift mechanism generally indicated at 19 provides for a high range of gear ratios needed for steep grades.

The brake assembly 13 provides braking action at the front wheel 16 and rear wheel 17 as explained below, and is actuated by respective grip subassembly 10 or 11 through a pair of conventional operating pull-up lever subassemblies 20, 21.

As shown in FIG. 2, each lever subassembly 20 or 21 includes a stationary member 22 attached to one of the handle bars 14 by a clamp 23. Each lever subassembly 20, 21 also includes a movable member 25 pivotally attached to stationary member 22 via pivot pin 27 extending transverse to the bars 14. The movable member 25 includes a leveraging arcuate handle 28 terminating in an end segment 29 concave with respect to the handlebar(s) 14.

FIG. 3 shows the handle 28 in still more detail. As shown, the handle 28 also includes a forward segment 30 seen to comprise a riveted bracket 31 having a slotted end wall 32 capturing a brake cable 33. The pull-up movement of levering handle 28 is about pin 27 in the direction of arrow 34 toward the hand grip 15. The cable 33 and its outer sheath 35 (attached to shield 36 of the stationary member 22) terminate at one of a pair of pivotally mounted braking subassemblies 37 located at the front or rear wheels 16, 17 (FIG. 1). Each subassembly 37 is controlled so as to cause rotation of arms 38 against the resistance of a torsion spring (not shown). Such rotation brings about frictionally contact between rim 39 of the wheel 16, 17 and friction shoes 38a attached to the arms 38.

Whether adapted for use in single wheel or dual wheel braking action, each grip subassembly 10, 11 is individually utilized. As shown best in FIG. 3, each grip subassembly 10, 11 comprises hand grip 15 in association with a loopable cord 40. Each hand grip 15 is of elongated construction. Such construction includes an elongated support cylinder 41 having an enlarged head 42 positioned adjacent to end 43 of the handle bars 14. The support cylinder 41 also includes a central section 44 directly above the arcuate handle 28 of the brake lever subassembly 21. A longitudinal bore 45 slightly greater in diameter than the handle bar 14, extends through both the central section 44 and the enlarged head 42 in concentric fashion. At the exterior of the central section 44 is a compressible cylindrical cover 46 preferably of rubber. The cover 46 is mounted in telescoping fashion about the central section 44 in abutting end contact with wall 47 of the enlarged head 42. Also the outer diameter of the compressible cover 46 is seen to be larger than that of the enlarged head 42 of the cylinder 41, and is of sufficient length to comfortably accommodate the grip of the rider.

Furthermore, as shown best in FIG. 6, the enlarged head 42 is fitted with a pair of radial openings 50 extending through side wall 51. The pair of openings 50 form parallel cavities and at the intersection of wall segment 51a with outer surface 53 of the handle bar 14, interconnect and define an attachment area A. As explained in more detail below, the attachment area A in association with openings 50 aid in capture of a segment of the cord 40 to operatively attach the cord 40 relative to the support cylinder 41. Still referring to FIG. 6, the attachment area A is positioned at the intersection of wall segment 51a with outer surface 53 of the handle bar 14 between openings 50 so that the cord 40 is bisected by working plane P coincident with axis of symmetry 52 of the grip 15. Hence precise manual rotary movement of the grip by the rider in either counter- or clockwise direction away from a non-braking nadir position of FIGS. 3 and 6, can be used to cause pivoting of the handle 28 upward toward the hand grip 15.

Before the grip 15 is attached in telescoping fashion to the handle bar 14, however, the latter must be prepared to accommodate the grip 15 with a proper bearing surface. Plastic spacers, one of which is shown at 55 in FIGS. 3 and 5, are placed at exterior surface 53 of the handle bar 14.

Usually two spacers 55 are sufficient to form a suitable bearing surface for the grip subassembly of the present invention. The distance between them can vary but must be less than the length of the hand grip 15. Note that the bearing spacers 55 are preferably constructed by wrapping ultra high molecular weight polyethylene tape (about 0.5 to 0.75 cm. thick) about the handle bars 14. In that way, a single length of such tape can be packaged with other component comprising the grip subassemblies 10, 11 of the invention. Yet such length can be chosen so as to accommodate the many different diametered handle bars manufactured in the industry.

Note also that the spacers 55 also aid in the formation of adequate clearance space at attachment area A, i.e., in the area where the cord 40 penetrates through the radial openings 50. Thus, there is no need for further slotting of the wall segment 51a of the support cylinder 41 to accommodate the cord 40.

That is, as shown in FIG. 6, the attachment area A is defined by the projection of wall segment 51a with outer surface 53 of the handle bar 14, and is positioned in its non-operating condition such that it is bisected by working plane P coincident with axis of symmetry 54 of the grip 15.

Hence, in the invention, precise manual rotary movement of the grip 15 by the rider in either counter- or clockwise direction away from a non-braking nadir position of FIG. 6, can be used to cause pivoting of the brake handle 28 of FIG. 3 upward toward the grip 15. Furthermore, such movement is transferred to the braking subassembly 37 (see FIG. 1) located at the wheel(s) 16, 17 via linear movement of the cable 33 attached to the movable member 25. Such linear cable movement is direct function of the arcuate distance the attachment area A (at the cord 40 and wall segment 51a) moves from its central, non-braking nadir position about a point of formation coincident with the working plane P and the axis of symmetry 54.

Next, after the spacers 55 have been attached to the handle bar 14, the grip 15 comprising support cylinder 41 and compressible cover 46 is slide over the handle bars 14 about the spacers 56. The grip 15 is forced to travel along the handle bar 14 until a forward end 57 (FIG. 3) contacts clip 23 of the stationary member 22. A rearward end 58 is placed in contact with an end cap 59 affixed to the handle bar 14 by an adhesive such as Loctite Threadlocker 242 manufactured by Loctite Corporation, Newington, Ct. 06111. The cord 40 is next looped about the arcuate handle 28 of the movable member 25. Preferably, such looping attachment is within the region defined by concave end segment 29 of the handle 28. Since there is still sufficient area for the rider to grip the movable handle 28, he is free to shift his fingers from the cover 46 to the handle 28 and operate the hand brake system 13 (FIG. 1) while the bike is in motion.

FIGS. 7-10 illustrate sequential movement of cord 41 as such clockwise and counterclockwise rotation of the grip 15 occurs.

As shown in FIGS. 7 and 8, clockwise movement of the grip 15 about axis of symmetry 54 brings attachment area A (between the cord 40 and wall segment 51a) in like arcuate movement along a pathway almost coincident with the exterior surface 53 of the handle bar 14. In FIGS. 9 and 10, attachment area A is in a counter clockwise movement mode along a similar pathway defined as above. In both types of motion, the length of travel from the nadir position can be directly translated in linear movement at the conventional braking subassembly 37 (see FIG. 1) at the wheel 16, 17.

Hence, in this regard, it should be noted that the resulting braking action is a direct function of travel of the attachment area A from the central non-braking nadir position about a point of formation coincident with the axis of symmetry 54 of the grip 15. In this regard, the non-braking nadir position and point of formation are planar. And movement of the attachment area A defines a plane of rotation that is normal to the common plane of the nadir position, as counter- or clockwise rotation of the hand grip 15 occurs.

FIGS. 4, 11 and 12 illustrate alternative embodiments.

As shown in FIG. 4, a latching mechanism 60 is shown attached between the support cylinder 41 of the grip 15 and the end cap 59. Such attachment is provided by a pivot pin 61 anchored to the end wall 58 of the support cylinder 41. In that way, head 60a attached to body 60b can be conditionally positioned within opening 62 in the end cap 59. Such attachment occurs when the rider decides to de-activate the grip subassembly of the present invention. In that way, the invention in no way inhibits the rider from using the conventional hand braking system 13 of FIG. 1, if he so desire. Moreover, a combination of operation is also contemplates as when the rider uses his left hand to operate the hand braking system 13 using one the lever subassembly 20, 21 in a conventional manner (i.e., latching mechanism 60 is engaged with the end cap 59. He is then free to use his dominant right hand to operate the remaining grip subassembly of the present invention in the manner taught herein.

As shown in FIGS. 11 and 12, the grip 15' may also be formed with a tab region 70 parallel to the axis of symmetry 54' of the grip 15'. As shown, the tab region 70 includes a transverse opening 72 through which the cord 40' extends.

METHOD ASPECTS

In carrying out the invention, the following steps are performed in sequence:

(i) establishing an attaching means within the hand grip 15, say by forming radial openings 50 and attaching area A (transverse to the axis of symmetry 54) in the side wall 51 of the of the enlarged head 42 of the support cylinder 41 as are the axes of symmetry of the openings 50;

(ii) attaching the hand grip 15 to a loopable cord 40 by passing an end of the cord 40 into one of the openings 50 then across the attachment area A and thence back through the other opening 50. The cord 40 is then pulled until cord lengths relative to the attachment area A are substantially equal;

(iii) telescopically attaching the grip 15 to the handle bar 14 wherein the openings 50, wall segment 51a, attachment area A and cord 40 are closely adjacent to the movable member 25 of the conventional pull-up braking system 13, and wherein the ends 57, 58 of the grip 15 butt against the stationary member 22 of the braking system 13 and the end cap 59, respectively;

(iv) tieing the cord 40 about an angled concave handle 28 of the movable member 25 and then adjusting the pull-up distance of the movable member 25 so that minimum space exists between the friction shoes 38a and the wheel rim 39 at the front or rear wheel brake subassembly 37;

(v) with the rider gripping the hand grips 15 but not the movable members 25 of the conventional braking system 13, rotating the hand grips 15 relative to the handle bars 14 in either a counter- or clockwise direction wherein the attaching area A between the cord 40 and openings 50 is caused to travel an arcuate distance about a point of formation coincident with the axis of symmetry 52 and working plane P;

(vi) transforming the arcuate travel of the attaching area A to linear movement of the cable 33 attached to the movable member 25 whereby braking action is achieved at the front and/or back wheel brake subassemblies 37 of the bicycle wheel(s) 16, 17, respectively.

There are additional substeps related to the following.

For example, step (iii) can be preceded by the substep of:

(A) forming a pair of plastic bearings 55 near an end of the handle bars 14 by wrapping two separate lengths of ultra high molecular weight polyethylene tape around handlebars 14 the distance between bearings 55 is at least less than the length of the hand grip 15.

Still further, step (iii) can also include the substep of:

(A') attaching end cap 59 to the handle bar(s) 14 using a semi-permanent adhesive such as comprising methacrylic ester that provides high strength whereby the end cap 59 semi-permanently butts against the rearward end 58 of the support cylinder 41. A preferred example of such adhesive is one manufactured by Loctite Corporation as Threadlocker 242.

Having described a method and apparatus in accordance with the present invention in which its advantages can be appreciated by those skilled in the art, it is also evident that certain variations are also suggested. It is therefore my intent that such variations be within the scope of the present invention as set forth in the following claims.

What is claimed is:

1. A hand grip subassembly for a bicylist's use with a conventional cable operated, pull-up braking system to provide bi-directional braking action without change in the rider's grip, comprising:

a multi-sprocketed derailleur-controlled bicycle having handle bars, a frame upon which front and rear wheels are rotatably mounted, a conventional cable operated, pull-up braking system including a pair of levered subassemblies attached to said handle bars and braking subassemblies attached at said front and rear wheel, each levered subassembly of said conventional cable operated, pull-up braking system including stationary and movable members and a cable, each movable member including a handle, said cable being attached to said movable member and terminating at one of said braking subassemblies, a cord of predetermined length, a hand grip of elongated construction having a longitudinal bore into which one of said handle bars of said bicycle is slidably positioned about the rotatable with respect to said handle bar, and a side wall fitted with attaching means positioned closely adjacent to said handle of said movable member of said conventional pull-up braking system, said attaching means fastening said cord to said hand grip, said cord being attached to said handle of said movable member of said conventional pull-up braking system, whereby a non-braking nadir position is established for said attaching means but where in new precise, easily controllable braking positions can thereafter be easily established as said hand grip subassembly is rotated in both counter- and clockwise directions about an axis of symmetry of said bore relative to said handle bar.

2. The hand grip subassembly of claim 1 in which said nadir position is bisected by a working plane wherein precise manual rotary movement of the grip by the rider's hand in one of said counter- and clockwise directions, provides a new braking position to thereby cause pivoting of said movable member of said conventional braking system and braking action at said wheel of said bicycle.

3. The subassembly of claim 2 including a cylindrical cover attached about and concentric of said longitudinal bore, said cover being constructed of compressible rubber and being of sufficient length to accommodate the grip of the rider about said grip subassembly.

4. The subassembly of claim 2 including bearing means attached between said longitudinal bore and said handle bar to promote relative rotation between said grip subassembly and said handle bar.

5. The subassembly of claim 4 in which said bearing means comprise first and second annuli each formed of an ultra high molecular weight polyethylene tape wound about said handle bar forming a bearing surface between said longitudinal bore and said handle bar.

6. The subassembly of claim 2 including an end cap in semi-permanent attaching surface contact with an end of said handle bar in abutting end contact with enlarged head means of said side wall to prevent loosening of said grip subassembly relative to said handle bar.

7. The subassembly of claim 6 in which said semi-permanent attaching surface for said end cap is provided by a semi-permanent adhesive.

8. The subassembly of claim 2 in which said attaching means includes a pair of radial openings bisected by said working plane forming separate cavities and a transverse attachment area (A) whereby both said hand grip subassembly and said handle of said movable member can be attached together by said cord, in a rotational relationship.

9. The subassembly of claim 2 including a latching means attached between said side wall and said end cap for conditionally preventing rotation of said grip subassembly.

10. The subassembly of claim 9 in which latching means includes body means attached to said support cylinder, an opening in said end cap and a head attached to said body means for conditional entry into said opening as when the rider decides to de-activate said grip subassembly and use only said conventional hand braking system.

11. The subassembly of claim 2 in which said side wall is elongated over an arcuate segment to form a tab region closely adjacent to said handle of said movable member.

12. The subassembly of claim 11 in which arcuate segment includes a transverse opening for attaching said cord to both said hand grip and said handle of said movable member to thereby establish said central, non-braking nadir position, yet allowing rotation in both counter- and clockwise directions relative to said nadir position.

13. A method of providing and using hand grip subassembly in association with a conventional cable operated, pull up braking system to provide bi-directional braking action without change in the rider's grip associated with a multi sprocketed derailleur-controlled bicycle (12), said bicycle having a frame (9) upon which front and rear wheels (16), (17) are rotatably mounted, handle bars (14) and a conventional cable operated, pull-up braking system (13) including a pair of levered subassemblies (20), (21) attached to said handle bars (14) and braking subassemblies (37) attached at said front and rear wheels (16), (17), each levered subassembly (20), (21) including stationary and movable members (22), (25) and a cable (33) attached to handle (28) of said movable member (25) and terminating at one of said braking subassemblies (37), comprising the steps of:
  (i) establishing transverse attaching means in a hand grip (15) relative to the axis of symmetry (54) of a longitudinal bore (45) of each grip (15),
  (ii) activating the attaching means to attach the hand grip (15) to a loopable cord (40) by passing an end of the cord (40) into and through a pair of openings (50) in a side wall of the grip (15) thereby establishing an attachment area (A) transverse to the axis of symmetry (54) and then pulling the cord (40) until cord lengths relative to the attaching means are substantially equal,
  (iii) telescopically attaching the grip (15) to the handle bar (14) wherein the attaching means is positioned closely adjacent to the movable member (25) of the conventional pull-up braking system (13), and wherein the ends (57), (58) of the grip (15) butt against the stationary member (22), of the braking system (13) and an end cap (49), respectively,
  (iv) tieing the cord (40) about the handle (28) of the movable member (25) and then adjusting the pull-up distance of the movable member (25) so that minimum space exists between the friction shoes (38a) and the wheel rim (39) at the front or rear wheel brake subassembly (37),
  (v) with the rider gripping the hand grips (15) but not the movable members (25) of the conventional braking system (13), rotating at least one of the hand grips (15) relative to the handle bars (14) in one of a counter- and clockwise direction wherein the attaching area (A) is caused to travel an arcuate distance about a point of formation coincident with working plane (P) and the axis of symmetry (54) of each hand grip (15),
  (vi) transforming the arcuate travel of the attaching area (A) to linear movement of the cable (33) attached to the movable member (25) whereby braking action is achieved at the front and/or back wheel brake subassemblies (37) of the bicycle wheel(s) (16), (17), respectively.

14. A hand grip subassembly for a bicyclist's use with a conventionally operated, pull-up braking system to provide bi-directional braking action without change in the rider's grip, comprising:
  a multi-sprocketed derailleur-controlled bicycle having handle bars, a frame upon which front and rear wheels are rotatably mounted, a conventional cable operated, pull-up braking system including a pair of levered subassemblies attached to said handle bars and braking subassemblies attached at said front and rear wheel, each levered subassemblies of said conventional cable operated, pull-up braking system including stationary and movable members and a cable, each movable member including a handle, said cable being attached to said movable member and terminating at one of said braking subassemblies,
  a cord of predetermined length,
  a hand grip of elongated construction including: (i) a support cylinder having an enlarged head, a central segment and a longitudinal bore slightly greater in diameter than the handle bar ends extending through both said central segment and said enlarged head in concentric fashion; (ii) attaching means within said enlarged head attached to said cord wherein said attaching means and said cord are positioned adjacent to said handle of said movable member of said pull-up braking system, said cord being loopable around and fixedly attached to said handle of said movable member for establishing a central, non-braking nadir position for the bicycle, yet allowing rotation in both counter- and clockwise directions therefrom whereby precise manual rotary movement of the grip by the rider's hand in one of said counter- and clockwise directions relative to said nadir position, can be used to cause pivoting of said movable member of said conventional braking system and braking action at said wheel of said bicycle.

15. The subassembly of claim 14 in which said attaching means includes a pair of openings and attachment area (A) bisected by a working plane coincident with said axis of symmetry by which said cord is captured whereby both said hand grip and said handle of said movable member are attached together in a rotational relationship in which said central, non-braking nadir position is established, yet rotation in both counter- and clockwise directions relative to said nadir position, is permitted.

* * * * *